United States Patent
George et al.

(10) Patent No.: US 8,521,765 B2
(45) Date of Patent: Aug. 27, 2013

(54) METHOD AND SYSTEM FOR POST PROCESSING TRACE DATA

(75) Inventors: H. Allan George, Mulgrave (CA); Emmanuel Touron, Vannes (FR)

(73) Assignee: Wind River Systems, Inc., Alameda, CA (US)

( * ) Notice: Subject to any disclaimer, the term of this patent is extended or adjusted under 35 U.S.C. 154(b) by 973 days.

(21) Appl. No.: 12/178,264

(22) Filed: Jul. 23, 2008

(65) Prior Publication Data
US 2010/0023483 A1 Jan. 28, 2010

(51) Int. Cl.
*G06F 17/30* (2006.01)
(52) U.S. Cl.
CPC .............................. *G06F 17/30424* (2013.01)
USPC .............. 707/769; 707/706; 707/749; 714/45
(58) Field of Classification Search
USPC ............. 707/706, 749, 769; 703/26; 714/38, 714/45; 717/130
See application file for complete search history.

(56) References Cited

U.S. PATENT DOCUMENTS

| | | | |
|---|---|---|---|
| 5,642,478 A * | 6/1997 | Chen et al. ...................... 714/45 |
| 5,682,328 A * | 10/1997 | Roeber et al. ................. 702/187 |
| 6,067,544 A * | 5/2000 | Moore ........................... 707/749 |
| 6,279,127 B1 * | 8/2001 | Moore ........................... 714/47.3 |
| 6,314,530 B1 * | 11/2001 | Mann ......................... 714/38.11 |
| 6,421,675 B1 * | 7/2002 | Ryan et al. .................... 707/706 |
| 6,684,348 B1 * | 1/2004 | Edwards et al. ................ 714/45 |
| 6,751,789 B1 * | 6/2004 | Berry et al. .................... 717/130 |
| 6,912,675 B2 * | 6/2005 | Swoboda ........................ 714/45 |
| 6,918,065 B1 * | 7/2005 | Edwards et al. ................ 714/45 |
| 6,985,848 B2 * | 1/2006 | Swoboda et al. ............... 703/26 |
| 7,347,619 B2 * | 3/2008 | Lee ............................... 368/296 |
| 2006/0259824 A1 * | 11/2006 | Sohm et al. .................... 714/38 |

* cited by examiner

*Primary Examiner* — Shahid Alam
(74) *Attorney, Agent, or Firm* — Fay Kaplun & Marcin, LLP

(57) ABSTRACT

A system and method for storing a plurality of trace records in a memory and searching, by a hardware processor, the plurality of trace records for specific trace data from the trace records, the searching including feeding the trace records back into a hardware real time event processor that collected the trace records.

14 Claims, 2 Drawing Sheets

METHOD AND SYSTEM FOR POST PROCESSING TRACE DATA

BACKGROUND

Software developers may typically log events that occur during the execution process. Recorded information may then be useful during debugging or other processes carried out on development or other software. Recorded information may be stored as trace data. Software developers may desire to search the trace data for specific events to aid in debugging. However, searching the trace data for specific events by software alone may take relatively long periods of time. Software developers may thus desire to utilize hardware solutions to decrease the length of time needed to search for specific events within trace data.

SUMMARY OF THE INVENTION

A method for storing a plurality of trace records in a memory and searching, by a hardware processor, the plurality of trace records for specific trace data from the trace records, the searching including feeding the trace records back into a hardware real time event processor that collected the trace records.

A system having a real time event processor monitoring code executing on a target device and collecting trace records, a memory storing the trace records and a post processor searching the trace records for specific data, the searching including feeding the trace records back into the real time event processor to be filtered to find the specific data.

DETAILED DESCRIPTION

Figure 1:
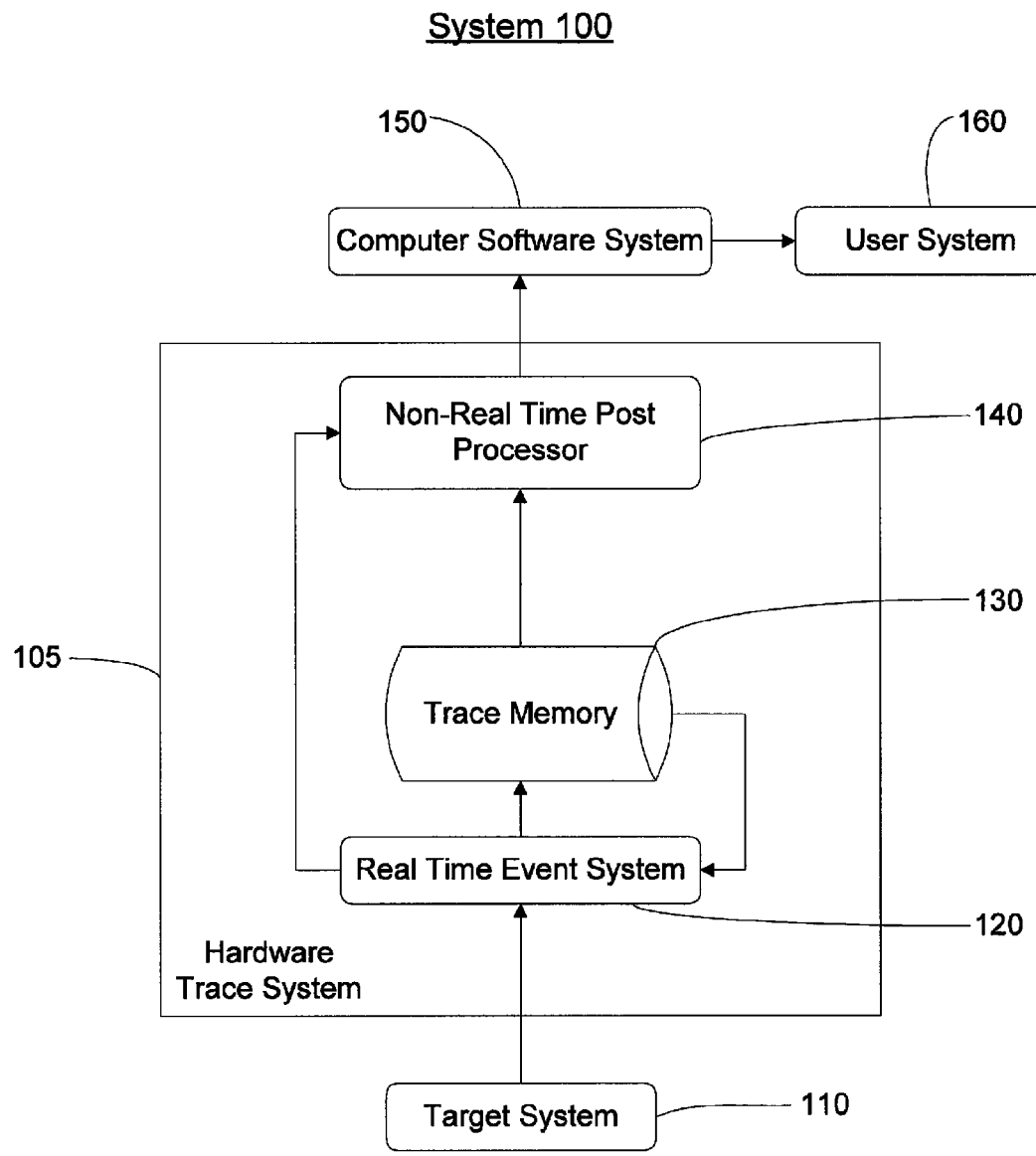
FIG. 1 shows an exemplary embodiment of a hardware based system for post-processing captured trace data according to the present invention.

The exemplary embodiments of the present invention may be further understood with reference to the following description and the appended drawings, wherein like elements are referred to with the same reference numerals. The exemplary embodiments of the present invention describe methods and systems for a hardware based trace post-processing system that in part reuses the real time event system in a non-real time mode to further filter the captured trace data stored in memory.

During program development and debugging, an integrated development environment (IDE) developer may create records of various events such as context switches, exception entries, triggers, etc. A record of such data may be referred to as a trace. A typical trace may include, for example, a record of all tasks that a program is performing at a particular point during its execution. After a trace has been recorded, a program developer may desire to search the trace records for specific events to aid in debugging/development.

Existing methods for searching trace data stored in memory are processed by software only to provide target information to the user. Existing methods are limited because trace memory depths are relatively very large and it may take the software a long period of time to perform specific searches and process the entire trace memory. The exemplary embodiments of the present invention provide for a more efficient method of searching the trace memory. Specifically, the exemplary embodiments of the present invention provides for a hardware based searching system and method to provide faster search results of the trace data.

FIG. 1 illustrates a system 100 for post-processing trace data from a target system 110. The hardware trace system 105 is comprised of three major components: a real time event system 120, a trace memory 130 and a non-real time post processor 140. Each of these components and their functionality will be described in greater detail below. However, in summary, the real time event system 120 is responsible for monitoring and selectively capturing the target system 110 trace cycles in real time. These trace cycles are stored in the trace memory 130 by the real time event system 120. After the real time acquisition has been halted, the non-real time post processor 140 may search the trace memory 130 for specific trace information. As described above, the non-real time post processor 140 will perform these searches at hardware speeds, thereby significantly increasing the speed of searches over a software system.

The non-real time post processor 140 may format the search results into filtered records and send them to a computer software system 150 which may further process the filtered results. The results of the further processing (e.g. higher-level information) may be sent to a user system 160 for display/use by the developer. An exemplary user system 160 may be the Workbench® product available from Wind River Systems Inc., of Alameda, Calif.

Figure 2:
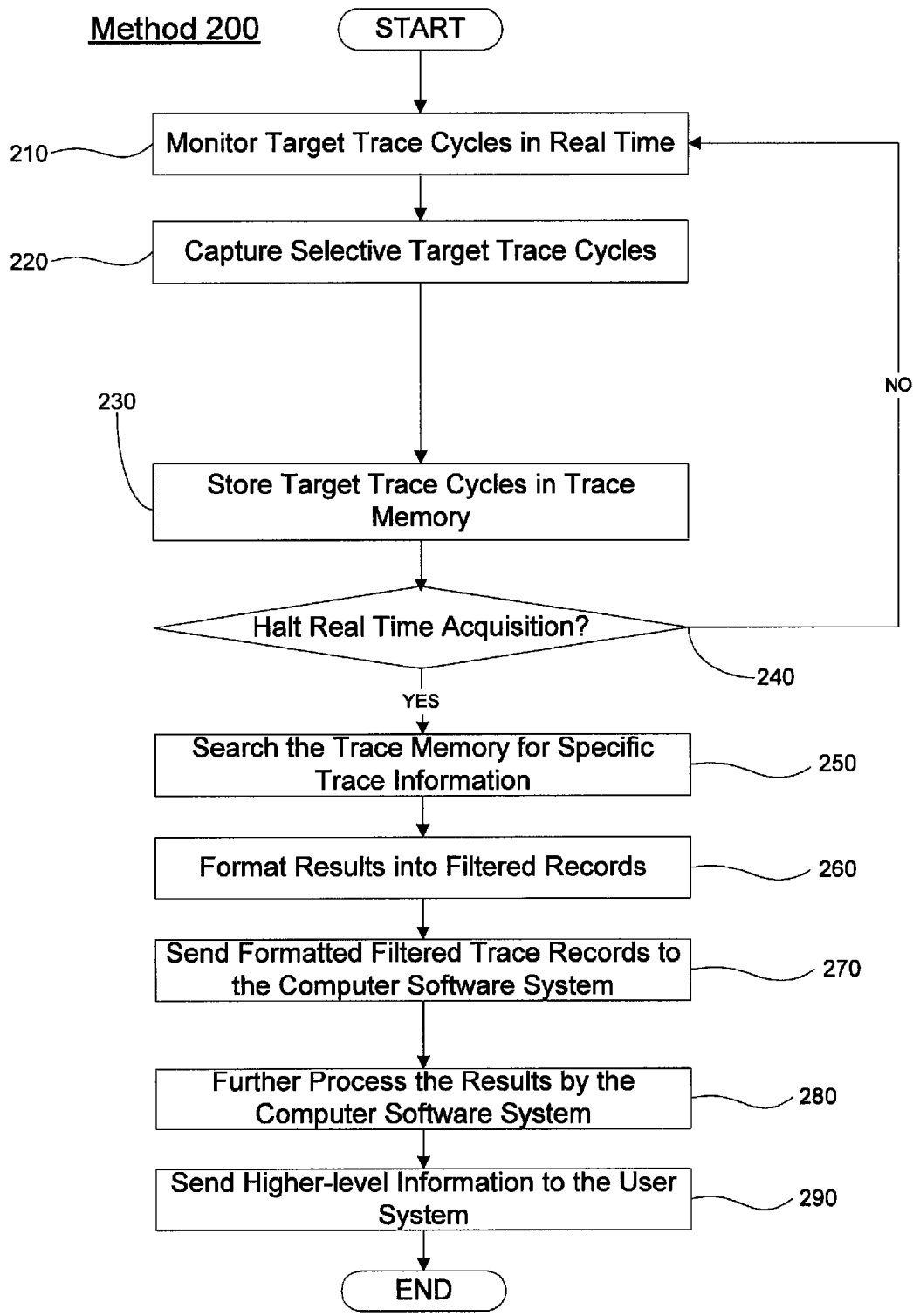
FIG. 2 shows a method for post-processing captured trace data according to the present invention.

FIG. 2 illustrates a method 200 of operating the system 100 illustrated in FIG. 1. In step 210, the real time event system 120 is responsible for monitoring target trace cycles in real time. In step 220, the real time event system 120 selectively captures target trace cycles. Those skilled in the art will understand that the trace cycles to be captured may be specified by software programmable registers. In step 230, the trace memory 130 stores the target trace cycles that have been captured by the real time event system 140.

In step 240, it is determined whether the real time acquisition has been halted. If the real time acquisition has not been halted, the method 200 loops back to continue the steps 210-230 as needed. If the real time acquisition has been halted, the method continues to step 250 where the non-real time post processor 140 may search the trace memory for specific trace information. It should be noted that as part of step 250, the non-real time post processor 140 may feedback the trace cycles stored in the trace memory 130 into the real time event system 120. The trace cycles that are fed back to the real time event system 120 will be further subjected to selective filtering. For example, as specified by the software programmable registers. Thus, in the exemplary embodiments, the real time event system 120 is reused to aid in the searching of the traced cycles.

The results of this further filtering by the real time event system 120 may be sent to the non-real time post processor 140, which, in step 260 may format the search results. In step 270, the non-real time post processor 140 sends the formatted results to the computer software system 150. The computer software system 150, in step 280, may further process the filtered results received from the non-real time post processor 140. The computer software system, 150, in step 290, subsequently sends the higher-level information to the user system 160.

The exemplary embodiments of the present invention provide for more efficient search and navigations mechanisms that minimize the trace memory search retrieval times. Prior methods are limited to software based trace searching methods. In contrast, the exemplary embodiments of the hardware based post processor according to the present invention reuses the real time event system to perform searches of the trace memory at hardware speeds. In addition, the processing of searches by the post processor at hardware speeds allows the parallel operation of software, which may process the current filtered results received from the post processor, while the post processor executes a new search. Further, the reuse of a hardware real time event system in a non-real time mode reduces the amount of hardware and software needed.

Those skilled in the art will understand that the above-described exemplary embodiments may be implemented in any number of manners. For example, the software programmable registers may be an FPGA and the user system may be hardware or software based.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A method, comprising:
    selectively collecting a plurality of trace cycles as requested by a software programmable register;
    storing the plurality of trace cycles in a trace memory;
    formatting, by a hardware processor, specific trace data from the trace cycles into filtered trace data as specified by the software programmable register;
    feeding, by the hardware processor, the filtered trace data back into a hardware real time event processor that collected the cycles;
    searching, by the hardware processor, the plurality of trace cycles in the trace memory for further trace data from the trace cycles while the hardware real time event processor further filters the filtered trace data;
    sending the further filtered trace data from the hardware real time event processor to the hardware processor; and
    formatting, by the hardware processor, the further filtered trace data.

2. The method of claim 1, further comprising:
    sending at least one of the formatted filtered trace data and the formatted further filtered trace data to a software system.

3. The method of claim 2, further comprising:
    processing, by the software system, at least one of the formatted filtered trace data and the formatted further filtered trace data.

4. The method of claim 1, further comprising:
    monitoring, by the hardware real time event processor, code executing on a target device.

5. The method of claim 4, further comprising:
    collecting, by the hardware real time event processor, the plurality of trace cycles while the target device is executing the code.

6. The method of claim 1, where the searching is performed when the hardware real time event processor is not monitoring executing code.

7. A system, comprising:
    a real time event processor monitoring code executing on a target device and selectively collecting trace cycles as requested by a software programmable register;
    a trace memory storing the trace cycles; and
    a post processor formatting specific trace data from the trace cycles into filtered trace data as specific by the software programmable register, feeding the filtered trace data back into the real time event processor that collected the trace cycles, and searching the trace cycles in the trace memory for further trace data while the real time event processor further filters the filtered trace data, the real time event processor sending the further filtered trace data to the post processor for formatting.

8. The system of claim 7, where the filtered trace data is fed back into the real time event processor when the real time event processor has halted monitoring of the code.

9. The system of claim 7, where the post processor formats the further filtered trace data.

10. The system of claim 9, further comprising:
    a software system receiving at least one of the formatted filtered trace data and the formatted further filtered trace data and processing the specific data to extract further data from the specific data.

11. The system of claim 10, where the software system outputs at least one of the formatted filtered trace data and the formatted further filtered trace data to a user system.

12. The system of claim 7, when the software programmable register is configured as a field-programmable gate array ("FPGA").

13. A system, comprising:
    a storing means for storing the plurality of trace cycles in a trace memory, wherein the plurality of trace cycles are selectively collecting as requested by a programmable software memory;
    a hardware processing means for formatting specific trace data from the trace cycles into filtered trace data as specific by the software programmable register,
    feeding the filtered trace data back into a real time event processing means that collected the trace cycles, and
    searching the plurality of trace cycles in the trace memory for further trace data from the trace cycles while the real time event processing means further filters the filtered trace data; and
    a transmission means for sending the further filtered trace data from the real time event processing means to the hardware processing means, wherein the hardware processing means formats the further filtered trace data.

14. The system of claim 13, further comprising:
    a further transmission means for sending at least one of the formatted filtered trace data and the formatted further filtered trace data to a software system processing means.

* * * * *